US010817595B2

(12) United States Patent
Cheng et al.

(10) Patent No.: US 10,817,595 B2
(45) Date of Patent: Oct. 27, 2020

(54) METHOD OF DEVICE UNLOCKING AND DEVICE UTILIZING THE SAME

(71) Applicant: NANNING FUGUI PRECISION INDUSTRIAL CO., LTD., Nanning (CN)

(72) Inventors: Pi-Lun Cheng, New Taipei (TW); Hsuan-Kuei Huang, New Taipei (TW)

(73) Assignee: NANNING FUGUI PRECISION INDUSTRIAL CO., LTD., Nanning (CN)

(*) Notice: Subject to any disclaimer, the term of this patent is extended or adjusted under 35 U.S.C. 154(b) by 120 days.

(21) Appl. No.: 16/276,453

(22) Filed: Feb. 14, 2019

(65) Prior Publication Data

US 2020/0265129 A1 Aug. 20, 2020

(51) Int. Cl.
*G06F 21/32* (2013.01)
*G06F 3/01* (2006.01)
*G06K 9/00* (2006.01)
*G06T 7/20* (2017.01)
*H04W 12/08* (2009.01)
*H04W 12/06* (2009.01)

(52) U.S. Cl.
CPC ............. *G06F 21/32* (2013.01); *G06F 3/013* (2013.01); *G06K 9/00221* (2013.01); *G06K 9/00617* (2013.01); *G06T 7/20* (2013.01); *H04W 12/06* (2013.01); *H04W 12/08* (2013.01)

(58) Field of Classification Search
CPC ..... G06F 21/32; G06F 3/013; G06K 9/00221; G06K 9/00617; G06T 7/20; H04W 12/06; H04W 12/08
See application file for complete search history.

(56) References Cited

U.S. PATENT DOCUMENTS

| 8,235,529 | B1* | 8/2012 | Raffle ................... A61B 3/113 351/209 |
| 8,942,434 | B1* | 1/2015 | Karakotsios ....... G06K 9/00597 345/619 |
| 10,643,086 | B1* | 5/2020 | Chang .................. G06K 9/0002 |
| 2017/0193213 | A1* | 7/2017 | Tsou ........................ G06F 3/013 |
| 2017/0251366 | A1* | 8/2017 | Perna ................... G06Q 20/322 |
| 2020/0026919 | A1* | 1/2020 | Boiko ................ G06K 9/00228 |

FOREIGN PATENT DOCUMENTS

| TW | I533234 | 5/2016 |
| TW | I613562 | 2/2018 |

OTHER PUBLICATIONS

A Review and Analysis of Eye-Gaze Estimation Systems, Algorithms and Performance Evaluation Methods in Consumer Platforms (Year: 2017).*
High Confidence Visual Recognition of Persons by a Test of Statistical Independence by John G. Daugman (Year: 1993).*
A Hough Based Eye Direction Detection Algorithm without On-site Calibration (Year: 2003).*

* cited by examiner

*Primary Examiner* — Nizar N Sivji
(74) *Attorney, Agent, or Firm* — ScienBiziP, P.C.

(57) ABSTRACT

A device unlocking method. The method shows challenging icons in challenging rounds and traces user pupils. The method requires a right user to have his pupil movement conform to a challenging icon through the challenging rounds. A device unlocks when a combined moving vector representing the pupil movement passes the challenging rounds and matches an unlocking condition.

20 Claims, 6 Drawing Sheets

METHOD OF DEVICE UNLOCKING AND DEVICE UTILIZING THE SAME

BACKGROUND

1. Technical Field

The disclosure relates to computer techniques, and more particularly to methods of unlocking a screen of a device.

2. Description of Related Art

Smart terminals such as mobile phones, computers, smart watches and wearable devices have a screen locking function in order to better ensure the security of users' privacies and data. Various existing screen unlocking methods, such as character password unlocking, fingerprint recognition unlocking, and face unlocking, may not address all aspects of privacy challenges. The character password unlocking methods may be problematic due to possibilities of forgetting the password or stealing of the password by others. Fingerprint recognition unlocking method may be problematic due to injuries to the fingers and inability to provide fingerprints. Face unlocking method may be difficult due to changes in appearances of the user, such as becoming fatter or thinner.

DETAILED DESCRIPTION

A device unlocking method based on eye recognition of present disclosure is executable by an electronic device, such as a laptop, a cell phone, or a smart phone. Detail description of embodiments of the device unlocking method is given in the following.

Figure 1:
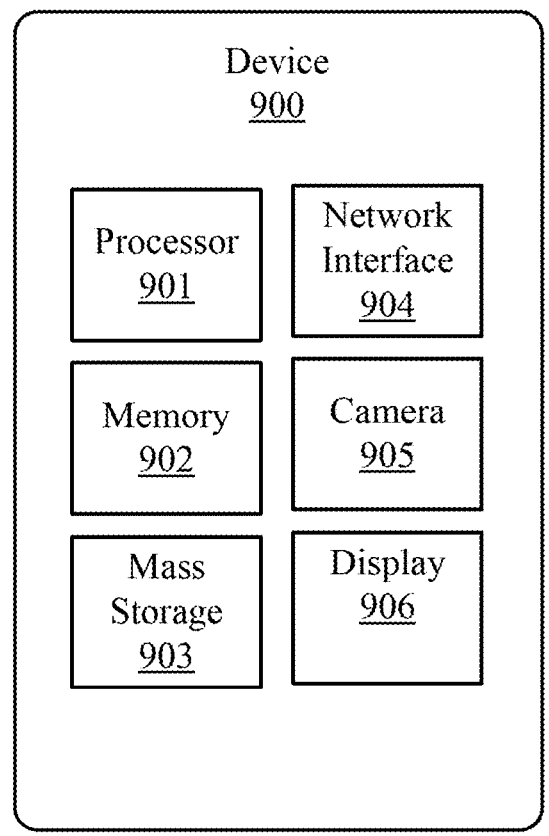
FIG. 1 is a block diagram of an embodiment of an electronic device of the present disclosure.

With reference to FIG. 1, the device unlocking method of present disclosure may be implemented by computer program stored in storage media, such mass storage 903 in a device 900. The computer program implementing the method, when loaded to a memory 902 by a processor 901, directs the processor 901 in the device 900 to execute the device unlocking method. The processor 901 communicates with other entities through a network interface 904. A camera 905 captures images of one or more users. The processor 901 may display challenging icons on a display 906.

Figure 2:
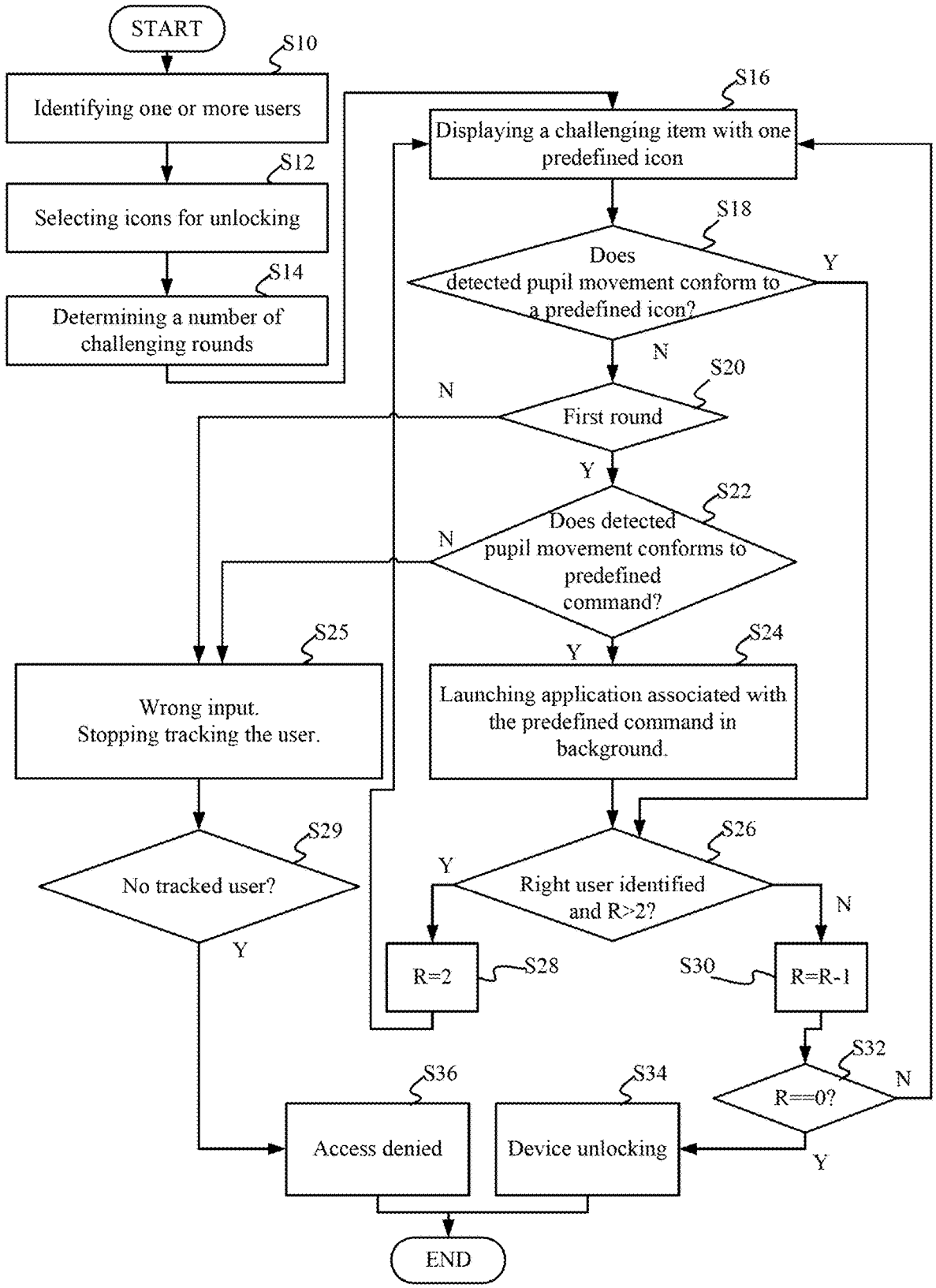
FIG. 2 is a flow diagram of an embodiment of an device unlocking method of the present disclosure.

With reference to FIG. 2, the processor 901 directs the camera 905 to capture a sequence of images, identifies one or more users in the captured sequence of images, and determines a total number of users identified in the captured sequence of images as M (block S10). The M users may be defined as a user set $U=\{U_1, U_2, \ldots U_M\}$, where each element of the user set U represents an identified user. For example, $U_1$ represents a first identified user. The processor 901 selects N icons for unlocking challenges (block S12). The N icons may be selected from an icon pool or an icon database. The processor 901 determines a challenging number R of challenging rounds based on the total number M of users (block S14). The processor 901 may use the following formula (1) to determine the challenging number R:

$$R=2+\lfloor \log_N M \rfloor \quad (1)$$

Figure 3:
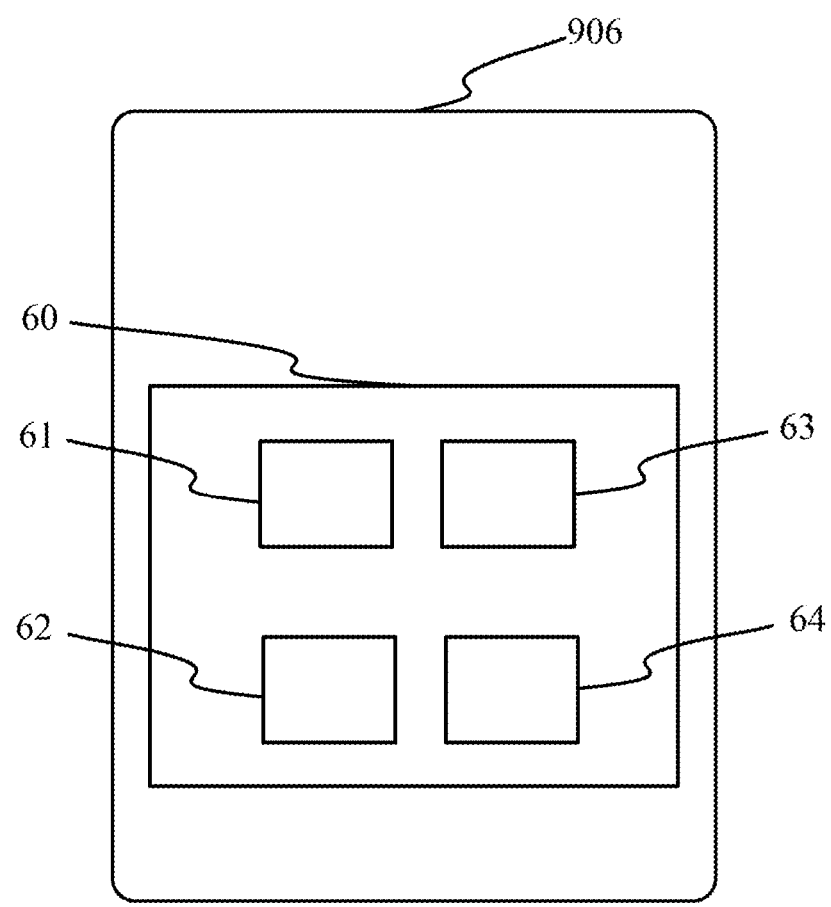
FIG. 3 is a block diagram showing an example of a challenging item.

The processor 901 displays a challenging item with only one predefined icon showing the unlocking patterns (block S16). With reference to FIG. 3, the processor 901 displays a challenging item 60.

The processor 901 determines whether any user of the user set U having pupil movement conform to the unlocking patterns of the predefined icon (block S18). The processor 901 obtains a combined moving vector $X_{trace\_n}$ representing pupil movement of a user. The combined moving vector $X_{trace\_n}$ is obtained from image frames of an eye of the user. The processor 901 executes block S26 when at least one user conforms to the predefined icon. The processor 901 determines whether at least one right user is identified and the challenging number R is greater than 2 (block S26).

The processor 901 determines a right user in the user set U having pupil movement conformed to the unlocking patterns of the predefined icon when the combined moving vector $X_{trace\_n}$ of the right user matches the unlocking patterns of the predefined icon, and adds the right user to a traced user set T as an element of the traced user set T. When no user conforms to the predefined icon, the processor 901 executes block S20.

In the block S18, the processor 901 may classify each user in the user set U having pupil movement conformed to the unlocking patterns of the predefined icon as an element of the traced user set T. The processor 901 may trace m number of users out of the user set U. The m number of traced users may be defined as a traced user set $T=\{P_1, P_2, \ldots P_m\}$, where each element of the user set T represents an traced user. For example, $P_1$ represent a first traced user. The processor 901 identifies a first character point of a user pupil utilizing a first pupil identifying scheme, and a second character point of the user pupil utilizing a second pupil identifying scheme. The processor 901 tracks a first moving vector of the first character point and a second moving vector of the second character point, and obtains the combined moving vector $X_{trace\_n}$ from the first moving vector weighted with a first weight and the second moving vector weighted with a second weight. The processor 901 determines a user in the user set U having pupil movements conformed to the unlocking patterns of the predefined icon when the combined moving vector $X_{trace\_n}$ of the user matches the unlocking patterns.

Figure 4:
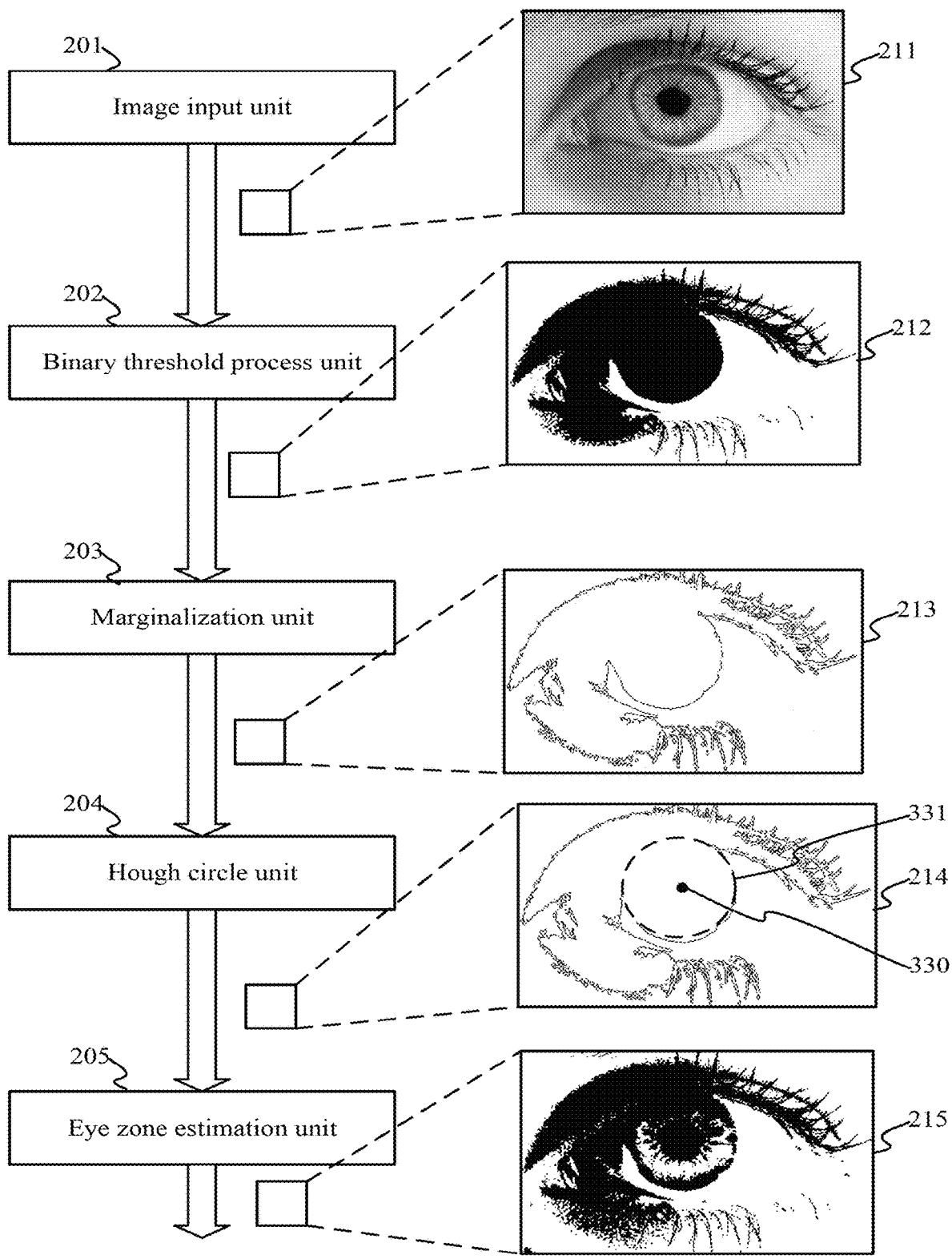
FIG. 4 is a block diagram showing an example of cascading processing of captured image frames of an eye.

With reference to FIG. 4, for example, the device 900 further includes an image input unit 201, a binary threshold process unit 202, a marginalization unit 203, a Hough circle unit 204, and an eye zone estimation unit 205. Each of the image input unit 201, binary threshold process unit 202, marginalization unit 203, Hough circle unit 204, and eye zone estimation unit 205 may be a circuit module integrated in an integrated circuit (IC) chip. Alternatively, each of the image input unit 201, the binary threshold process unit 202, the marginalization unit 203, the Hough circle unit 204, and the eye zone estimation unit 205 may be a program module with computer executable instructions. The image input unit 201 inputs an image 211 to the binary threshold process unit 202. The image 211 may be selected and extracted from a sequence of captured images. The binary threshold process unit 202 performs a binary threshold process on the image 211 to generate and output a binary image 212 to the marginalization unit 203. The marginalization unit 203 performs marginalization on the image 212 to generate and output an image 213 to the Hough circle unit 204. The image 213 has detected margin of an eye in the binary image 212. The Hough circle unit 204 performs a Hough circle process on the image 213 to generate and output an image 214 to the eye zone estimation unit 205. The Hough circle unit 204 detects an area in the image 213 similar to a circle and generates a Hough circle 331 to match the circle. The Hough circle 331 has a center 330. The eye zone estimation unit 205 recognizes eye zones in the image 214.

Figure 5:
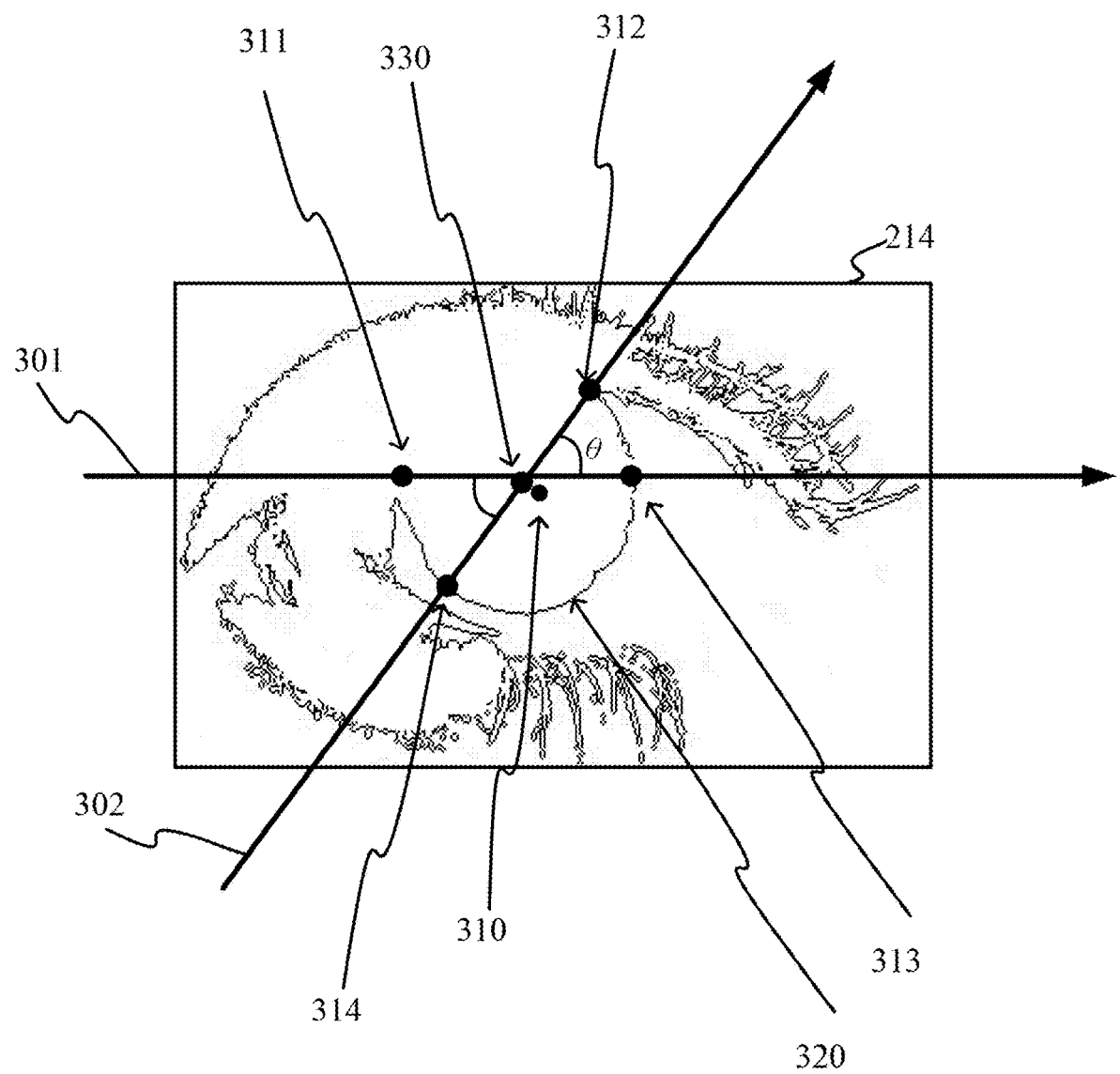
FIG. 5 is a block diagram showing an example of an image of an eye.

With reference to FIG. 5, the processor 901 obtains intersection points 311, 312, 313, and 314 on the Hough circle 331 as follows. A circumference 320 of the pupil in the image 214 intersects with an axis 301 and an axis 302 at the intersection points 311, 312, 313, and 314. The axis 301 is obtained by drawing a horizontal line passing through the center point 330 of the Hough Circle 331. Intersection points 311 and 313 are intersection points of the axes 301 and the Hough circle 331. The intersection point 312 is a point where the circumference of the pupil and the upper eyelid converge. The axis 302 is obtained by connecting the center point 330 of the Hough circle 331 to the intersection point 312. The processor 901 obtains the intersection point 312. The intersection point 314 is the intersection point of the axis 302 and the Hough circle 331, opposite to the intersection point 312.

The processor 901 may obtains a compensation diversity coordinate of the intersection points 311, 312, 313, and 314 as the first character point. For example, the processor 901 may use a 4 by 1 matrix C to record the intersection points 311, 312, 313, and 314, where each element of the matrix C represents one of the intersection points 311, 312, 313, and 314 with coordinates. C[1] represents the intersection point 311 with a coordinate $(x_1, y_1)$. C[2] represents the intersection point 312 with a coordinate $(x_2, y_2)$. C[3] represents the intersection point 313 with a coordinate $(x_3, y_3)$. C[4] represents the intersection point 314 with a coordinate $(x_4, y_4)$. The processor 901 may identify a compensation diversity point 310 at time n with the compensation diversity coordinate $\xi_n$ obtained from the intersection points 311, 312, 313, and 314 according to the following formula, formula (2):

$$\xi_n = \frac{\sum_{i=1}^{i=4} C[i](x_i, y_i)}{4} \quad (2)$$

In the formula (2), i is an integer variable, and n is an integer variable in a time domain. The processor 901 may obtain the compensation diversity point 310 with the coordinate $\xi_n$ as the first character point at time n. Similarly, the processor 901 may obtain another compensation diversity point with the coordinate $\xi_{n-1}$ as the first character point at time n−1. The processor 901 tracks a first moving vector $A_n$ representing a point movement from the coordinate $\xi_{n-1}$ at time n−1 to the coordinate $\xi_n$ at time n. The first moving vector $A_n$ may be referred to as a compensation diversity vector (CDV).

The processor 901 obtains a Hough circle in an image of the pupil and obtains a center point $P_{n-1}$ of the Hough circle as the second character point at time n−1. Similarly, the processor 901 obtains a Hough circle $H_n$ in an image of the pupil and obtains a center point $P_n$ of the Hough circle $H_n$ as the second character point at time n. The processor 901 tracks a second moving vector $B_n$ representing a point movement from the center point $P_{n-1}$ at time n−1 to the center point $P_n$ at time n.

The processor 901 obtains the combined moving vector $X_{trace\_n}$ from the first moving vector $A_n$ weighted with a first weight and the second moving vector $B_n$ weighted with a second weight. For example, the processor 901 may obtain the combined moving vector $X_{trace\_n}$ according to the following formula, formula (3):

$$X_{trace\_n} = \frac{2 \times A_n}{3} + \frac{B_n}{3} \quad (3)$$

In the formula (3), the first moving vector $A_n$ is weighted with the first weight of ⅔, and the second moving vector $B_n$ is weighted with the second weight of ⅓.

Figure 6:
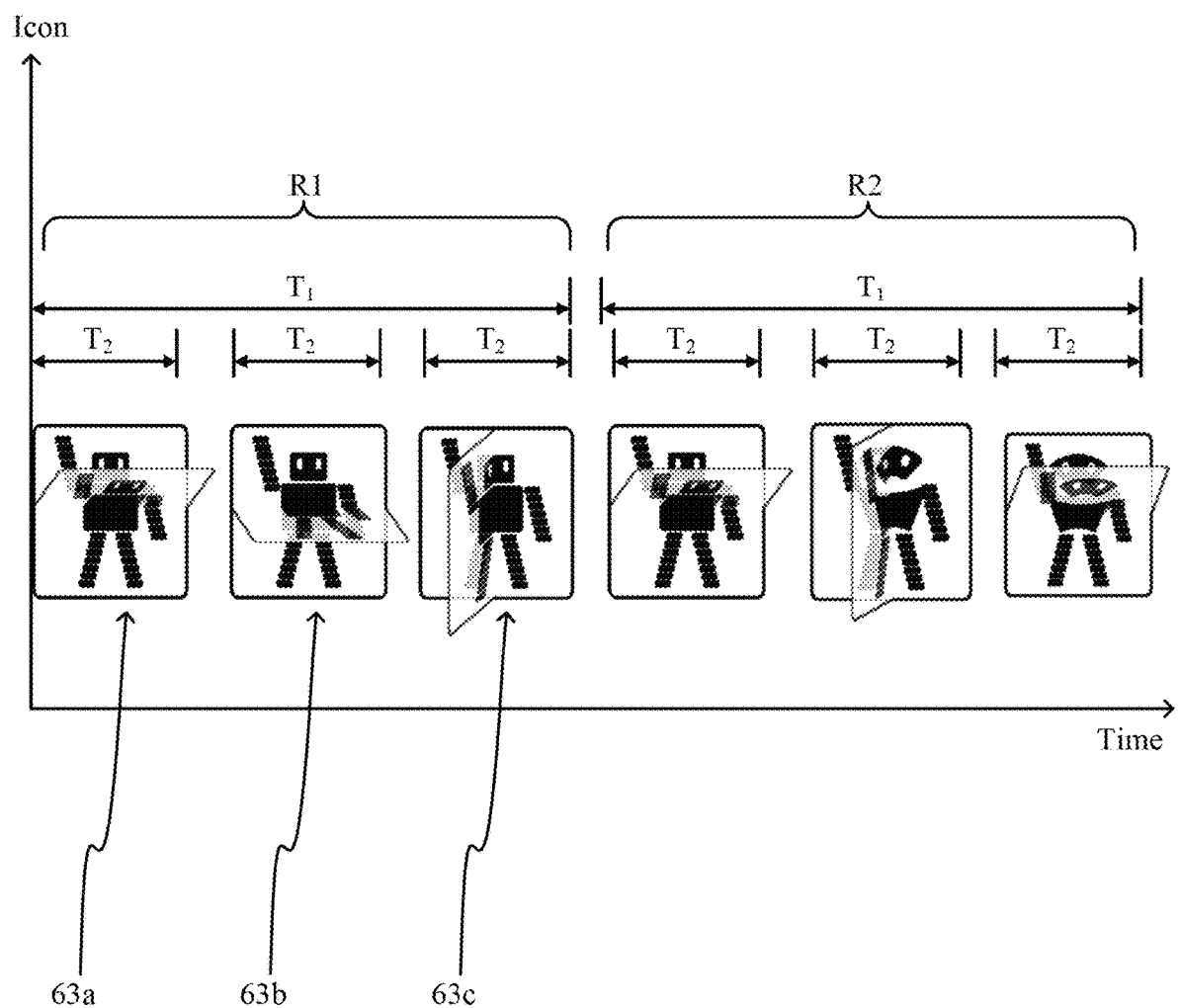
FIG. 6 is a block diagram showing animation of a challenging item along a time line.

With reference to FIG. 3, for example, the display 906 shows a challenging item 60 with icons 61, 62, 63, and 64 where only the icon 63 is the predefined icon which shows the unlocking patterns in the block S16. With reference to FIG. 6, if the challenging number R=2 is determined in block S14, a challenging round R1 is set up where each of the icon is presented for a time duration $T_1$ and the active unlocking pattern changes from one unlocking pattern to another unlocking pattern after each time duration $T_2$, where the time duration $T_2$ is division of the time duration $T_1$. As illustrated in FIG. 6, an animated icon 63a represents the icon 63 in the first duration $T_2$ showing a first unlocking pattern defined as an eye movement in a downward direction. An animated icon 63b represents the icon 63 in the second duration $T_2$ showing a second unlocking pattern defined as an eye movement in an upward direction. An animated icon 63c represents the icon 63 in the third duration $T_2$ showing a third unlocking pattern defined as an eye movement in a right direction. When the combined moving vector $X_{trace\_n}$ conforms to the downward direction in the first duration $T_2$, the upward direction in the second duration $T_2$, the right direction in the third duration $T_2$, the processor 901 determines that the user in the user set U associated with the combined moving vector $X_{trace\_n}$ conforms to the unlocking patterns of the predefined icon 63.

In block S26 of FIG. 2, the processor 901 determines a right user in the user set U having pupil movement conform to the unlocking patterns of the predefined icon when the combined moving vector $X_{trace\_n}$ of the right user matches the unlocking patterns, and added the right user to the traced user set T as an element of the traced user set T. In block S28, if the right user is identified and the challenging number R is greater than 2, the processor 901 sets the challenging number R equals to 2, speeds up the unlock challenging, and returns to block S16 to begin another challenging round, such as R2 in FIG. 6. In block S30, if the right user is identified and the challenging number R does not exceed 2, the processor 901 counts down the challenging number R. The processor 901 determines whether the challenging number R is equal to zero (block S32). When the challenging number R is equal to zero, the processor 901 determines the combined moving vector $X_{trace\_n}$ matches a predefined unlock condition, and performs device unlocking accordingly (block S34). When the challenging number R is not equal to zero, the processor 901 returns to block S16 to begin another challenging round, such as R2 in FIG. 6.

In block S18, when the user of the combined moving vector $X_{trace\_n}$ does not conform to a predefined icon, the processor 901 determines whether the challenging round is the first round (block S20). If the challenging round is not the first round, the processor 901 determines the combined moving vector $X_{trace\_n}$ is a wrong input, stops tracking the user, and removes the user from the traced user set T (block S25). If the challenging round is the first round, the processor 901 determines whether the combined moving vector $X_{trace\_n}$ matches a predefined application launch command associated with a first application (block S22). When the combined moving vector $X_{trace\_n}$ matches the predefined application launch command, the processor 901 launches the first application in the background followed by blocks to device unlocking (block S24). When the combined moving vector $X_{trace\_n}$ does not match the predefined application launch command, the processor 901 executes block S25. The processor 901 determines whether any user remains in the traced user set T (block S29). When no user is being tracked and the traced user set T is empty, the processor 901 denies access to the device (block S36). When at least one user is being tracked and the traced user set T is not empty, the processor 901 repeats block S26.

The processor 901 provides a challenging item in each of the challenging rounds, and determines the combined moving vector $X_{trace\_n}$ matches the predefined unlock condition when the combined moving vector $X_{trace\_n}$ passes a challenging item in the final round of the challenging rounds.

The processor 901 may determine a number of animated icons based on the detected number of device users.

The disclosure provides a device unlocking method. The method provides a challenging item in each challenging round, shows challenging icons corresponding to the challenging item, and traces user pupils to determine whether pupil movements pass the challenging round. According to the present disclosure, a user whose pupil movements conform to predefined eye movements will be able to unlock the device.

It is to be understood, however, that even though numerous characteristics and advantages of the disclosure have been set forth in the foregoing description, together with details of the structure and function of the present disclosure, the disclosure is illustrative only, and changes may be made in detail, especially in matters of shape, size, and arrangement of parts within the principles of the present disclosure to the full extent indicated by the broad general meaning of the terms in which the appended claims are expressed.

What is claimed is:

1. A device unlocking method based on eye recognition executable by an electronic device, comprising:
    identifying a first character point of a pupil image utilizing a first pupil identifying scheme, and a second character point of the pupil image utilizing a second pupil identifying scheme;
    tracking a first moving vector of the first character point and a second moving vector of the second character point;
    obtaining a combined moving vector from the first moving vector weighted with a first weight and the second moving vector weighted with a second weight;
    determining whether the combined moving vector matches an unlock condition, the unlock condition being predefined; and
    performing device unlocking when the combined moving vector matches the unlock condition.

2. The device unlocking method of claim 1, further comprising:
    determining whether the combined moving vector matches a application launch condition associated with a first application; and
    if the combined moving vector matches the application launch condition associated with the first application, launching the first application following the device unlocking process.

3. The device unlocking method of claim 1, wherein the unlock condition comprises a number of challenging rounds, and the device unlocking method further comprises:
    providing a challenging item in each of the challenging rounds; and
    determining that the combined moving vector matches the unlock condition when the combined moving vector passes the challenging item in each of the challenging rounds.

4. The method of claim 3, further comprising:
    detecting a number of device users; and
    determining the number of challenging rounds based on the detected number of device users.

5. The method of claim 3, further comprising:
    displaying a number of animated icons in the challenging item in each of the challenging rounds, wherein only one of the animated icons provides implication of eye movements in a predefined direction; and
    determining the combined moving vector matches the unlock condition when the combined moving vector conforms to the predefined direction.

6. The method of claim 5, further comprising:
    detecting a number of device users; and
    determining the number of animated icons based on the detected number of device users.

7. The method of claim 1, further comprising:
    obtaining four intersection points where a circumference of the pupil image intersects with two axes, wherein each of the two axes passes through a center of the pupil image; and
    obtaining a compensation diversity coordinate of the four intersection points as the first character point.

8. The method of claim 7, further comprising:
    obtaining a Hough circle from the pupil image; and
    obtaining a center point of the Hough circle and defining the center point of the Hough circle as the second character point.

9. The method of claim 8, further comprising:
    defining a first axis of the two axes as a horizontal axis passing through the center point of the Hough circle; and
    defining a second axis of the two axes as a non-horizontal axis connecting the center point of the Hough circle and an end point of the circumference of the pupil image.

10. The method of claim 9, further comprising:
    defining the end point as an intersection point of the circumference of the pupil image and an edge of an eyelid image.

11. A device comprising:
    a camera capturing pupil images; and
    a processor executing a device unlocking method, the device unlocking method comprising:
        identifying a first character point of a pupil image utilizing a first pupil identifying scheme, and a second character point of the user pupil image utilizing a second pupil identifying scheme;
        tracking a first moving vector of the first character point and a second moving vector of the second character point;

obtaining a combined moving vector from the first moving vector weighted with a first weight and the second moving vector weighted with a second weight;

determining whether the combined moving vector matches an unlock condition, the unlock condition being predefined; and performing device unlocking when the combined moving vector matches the unlock condition.

12. The device of claim 11, wherein the method further comprises:

determining whether the combined moving vector matches a application launch condition associated with a first application; and launching the first application following the device unlocking if the combined moving vector matches the application launch condition associated with the first application.

13. The device of claim 11, wherein the unlock condition comprises a number of challenging rounds, and the device unlocking method further comprises:

providing a challenging item in each of the challenging rounds; and determining that the combined moving vector matches the unlock condition when the combined moving vector passes the challenging item in each of the challenging rounds.

14. The device of claim 13, wherein the method further comprises:

detecting a number of device users; and determining the number of challenging rounds based on the detected number of device users.

15. The device of claim 13, wherein the method further comprises:

displaying a number of animated icons in the challenging item in each of the challenging rounds, wherein only one of the animated icons provides implication of eye movements in a predefined direction; and determining the combined moving vector matches the unlock condition when the combined moving vector conforms to the direction.

16. The device of claim 15, wherein the method further comprises:

detecting a number of device users; and determining the number of animated icons based on the detected number of device users.

17. The device of claim 11, wherein the method further comprises:

obtaining four intersection points where circumference of the user pupil image intersects with two axes, wherein each of the two axes passes through a center of the pupil image; and obtaining a compensation diversity coordinate of the four intersection points as the first character point.

18. The device of claim 17, wherein the method further comprises:

obtaining a Hough circle from the pupil image; and obtaining a center point of the Hough circle and defining the center point of the Hough circle as the second character point.

19. The device of claim 18, wherein the method further comprises:

defining a first axis of the two axes as a horizontal axis passing through the center point of the Hough circle; and defining a second axis of the two axes as a non-horizontal axis connecting the center point of the Hough circle and an end point of the circumference of the pupil image.

20. The device of claim 19, wherein the method further comprises:

defining the end point as an intersection point of the circumference of the pupil image and an edge of an eyelid image.

* * * * *